(12) United States Patent
Lee (10) Patent No.: US 8,130,353 B2
(45) Date of Patent: Mar. 6, 2012

(54) LIQUID CRYSTAL DISPLAY DEVICE AND METHOD OF FABRICATING THE SAME

(75) Inventor: Won-Ho Lee, Annyang-Si (KR)

(73) Assignee: LG Display Co., Ltd., Seoul (KR)

( * ) Notice: Subject to any disclaimer, the term of this patent is extended or adjusted under 35 U.S.C. 154(b) by 335 days.

(21) Appl. No.: 12/005,630

(22) Filed: Dec. 28, 2007

(65) Prior Publication Data

US 2008/0198318 A1  Aug. 21, 2008

(30) Foreign Application Priority Data

Feb. 16, 2007 (KR) .................. 10-2007-0016371

(51) Int. Cl.
*G02F 1/1333* (2006.01)

(52) U.S. Cl. ..................................... 349/141

(58) Field of Classification Search .................. None
See application file for complete search history.

(56) References Cited

U.S. PATENT DOCUMENTS

| 6,618,109 | B2 * | 9/2003 | Hidehira et al. | 349/141 |
| 6,757,042 | B2 * | 6/2004 | Lee et al. | 349/142 |
| 7,462,872 | B2 * | 12/2008 | Lee et al. | 257/83 |
| 7,492,428 | B2 * | 2/2009 | Lee | 349/141 |
| 2005/0280763 | A1 * | 12/2005 | Kang et al. | 349/141 |
| 2006/0055862 | A1 * | 3/2006 | Choi | 349/143 |

* cited by examiner

*Primary Examiner* — Thanh-Nhan Nguyen
(74) *Attorney, Agent, or Firm* — McKenna Long & Aldridge, LLP (57) ABSTRACT

A liquid crystal display device includes a gate line and a data line crossing each other to define a pixel region on a substrate; a thin film transistor connected to the gate and data lines; a pixel electrode in the pixel region and including a first pixel portion which has a plurality of bent portions and first and second pixel protrusion portions protruding from the bent portions alternately in an opposing direction; and a common electrode in the pixel region and including first and second common portions between which the first pixel portion is located, and first and second common protrusion portions protruding from the first and second common portions, respectively, alternately in a direction toward the bent portions.

18 Claims, 12 Drawing Sheets

LIQUID CRYSTAL DISPLAY DEVICE AND METHOD OF FABRICATING THE SAME

The present invention claims the benefit of Korean Patent Application No. 2007-0016371, filed in Korea on Feb. 16, 2007, which is hereby incorporated by reference for all purposes as if fully set forth herein.

BACKGROUND OF THE INVENTION

1. Field of the Invention

The present invention relates to a liquid crystal display device, and more particularly, to a liquid crystal display (LCD) device and a method of fabricating the same.

2. Discussion of the Related Art

Until recently, display devices have typically used cathode-ray tubes (CRTs). Presently, much effort and research is underway to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field vertically across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

The LCD device wherein the electric field is induced vertically has a disadvantage of a narrow viewing angle. To improve the viewing angle, an in-plane switching mode LCD (IPS-LCD) device is suggested.

Figure 1:
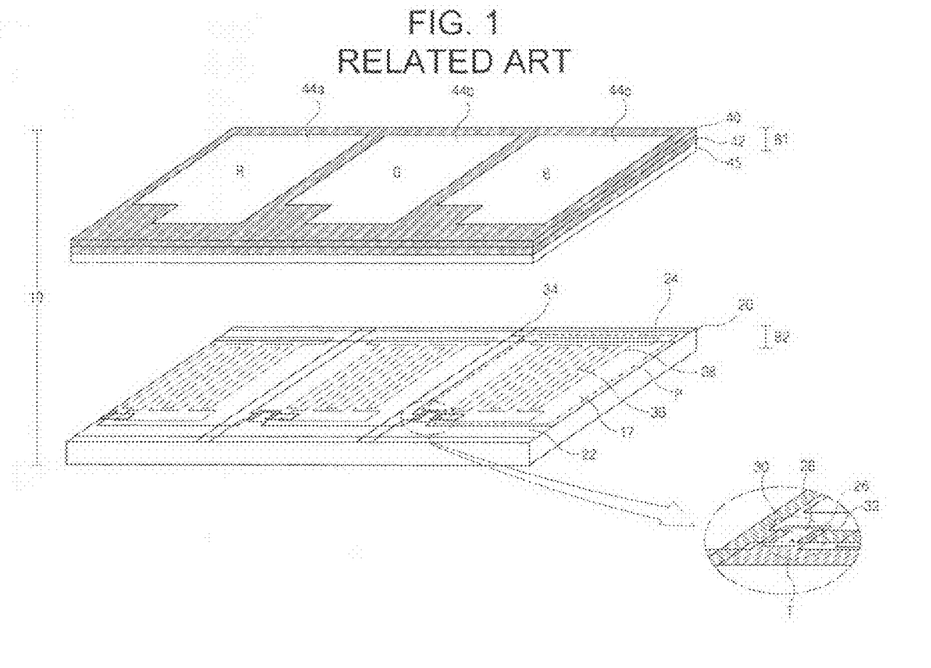
FIG. 1 is a perspective view illustrating an IPS-LCD device according to the related art.

FIG. 1 is a perspective view illustrating an IPS-LCD device according to the related art.

Referring to FIG. 1, the IPS-LCD device 10 includes an array substrate B2, a color filter substrate B1 and a liquid crystal layer (not shown) between the two substrates B1 and B2.

The array substrate B2 includes gate and data lines 22 and 34, respectively, crossing each other to define a pixel region P on a first substrate 20. A thin film transistor T is located at a crossing of the gate and data lines 22 and 34. The thin film transistor T includes a gate electrode 26, a semiconductor layer 28 and source and drain electrodes 30 and 32.

A pixel electrode 36 and a common electrode 38 alternate in the pixel region P. The pixel electrode 36 is connected to the drain electrode 32, and the common electrode 38 is connected to a common line 24. The common line 24 is parallel with the gate line 22.

The color filter substrate B1 includes red (R), green (G) and blue (B) color filter patterns 44a, 44b and 44c in respective pixel regions P and a black matrix 42 between the color filter patterns 44a, 44b and 44c, on a second substrate 40. A planarization layer 45 is located on the color filter patterns 44a, 44b and 44c.

Because the pixel and common electrodes 36 and 38 alternate in the same substrate, an in-plane electric field parallel with the substrate is induced. Liquid crystal molecules operate according to the in-plane electric field to display images with a wide viewing angle.

However, because the in-plane electric fields in regions between the pixel and common electrodes 36 and 38 have the same direction and the liquid crystal molecules in the regions are arranged in the same direction, a color shift may result at some angles.

To resolve the problem, an IPS-LCD device having dual domains is suggested. One of the dual domains is symmetrical to the other, and in-plane electric fields in dual domains are symmetrical to each other. Accordingly, dual domains compensate for each other, and color shift can be prevented.

Figure 2:
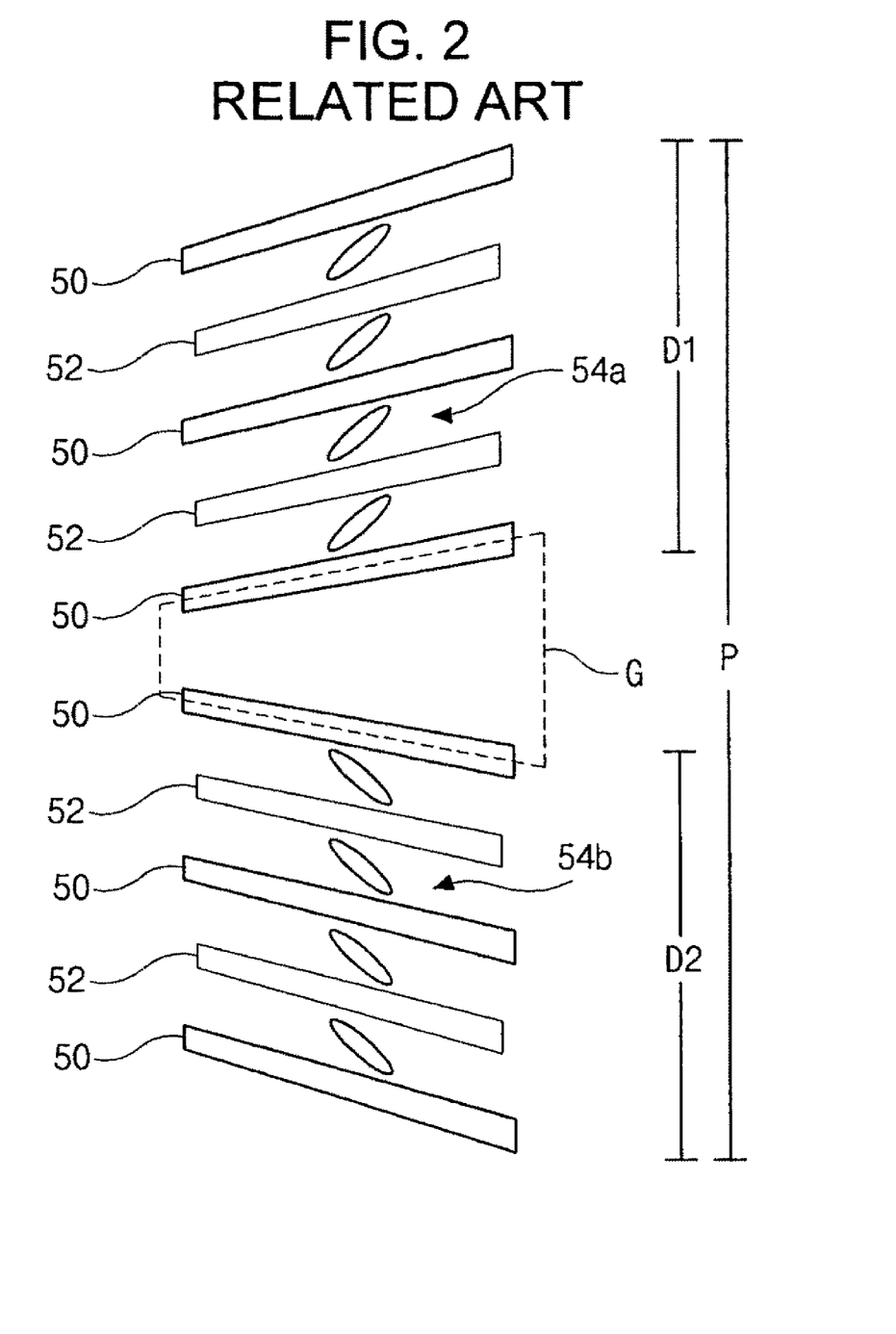
FIG. 2 is a view illustrating an IPS-LCD device having dual domains according to the related art.

FIG. 2 is a view illustrating an IPS-LCD device having dual domains according to the related art. The IPS-LCD device of FIG. 2 is referred to as a super IPS-LCD (S-IPS-LCD) device.

Referring to FIG. 2, a pixel region P has first and second regions D1 and D2. A pixel electrode 52 and a common electrode 50 alternate in each of the first and second regions D1 and D2. An arrangement of the pixel electrode 52 and the common electrode 50 in the first region D1 is symmetrical with an arrangement of the pixel electrode 52 and the common electrode 50 in the second region D2. A plurality of first domains defined by the pixel electrode 52 and the common electrode 50 in the first region D1 are symmetrical with a plurality of second domains defined by the pixel electrode 52 and the common electrode 50 in the second region D2.

Accordingly, an in-plane electric field in the first domain is symmetrical with an in-plane electric field in the second domain, and an arrangement of liquid crystal molecules 54a in the first domain is symmetrical with an arrangement of liquid crystal molecules in the second domain 54b. This symmetry makes the first and second domains compensate for each other, and thus color shift can be minimized.

However, in a middle region G, liquid crystal molecules are arranged abnormally. Accordingly, disclination occurs, and thus display quality is reduced.

SUMMARY OF THE INVENTION

Accordingly, the present invention is directed to a liquid crystal display device and method of fabricating the same that substantially obviates one or more of the problems due to limitations and disadvantages of the related art.

An advantage of the present invention is to provide a liquid crystal display device and method of fabricating the same that can improve display quality.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a gate line and a data line crossing each other to define a pixel region on a substrate; a thin film transistor connected to the gate and data lines; a pixel electrode in the pixel region and including a first pixel portion which has a plurality of bent portions and first and second pixel protrusion portions protruding from the bent portions alternately in an opposing direction; and a common electrode in the pixel region and including first and second common portion between which the first pixel portion is located, and first and second common protrusion portions protruding from the first and second common portions, respectively, alternately in a direction toward the bent portions.

In another aspect, a method of fabricating a liquid crystal display device includes forming a gate line and a data line crossing each other to define a pixel region on a substrate; forming a thin film transistor connected to the gate and data lines; forming a pixel electrode in the pixel region and including a first pixel portion which has a plurality of bent portions and first and second pixel protrusion portions protruding from the bent portions alternately in an opposing direction; and forming a common electrode in the pixel region and including first and second common portion between which the first pixel portion is located, and first and second common protrusion portions protruding from the first and second common portions, respectively, alternately in a direction toward the bent portions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to illustrated embodiments of the present invention, which are illustrated in the accompanying drawings.

Figure 3:
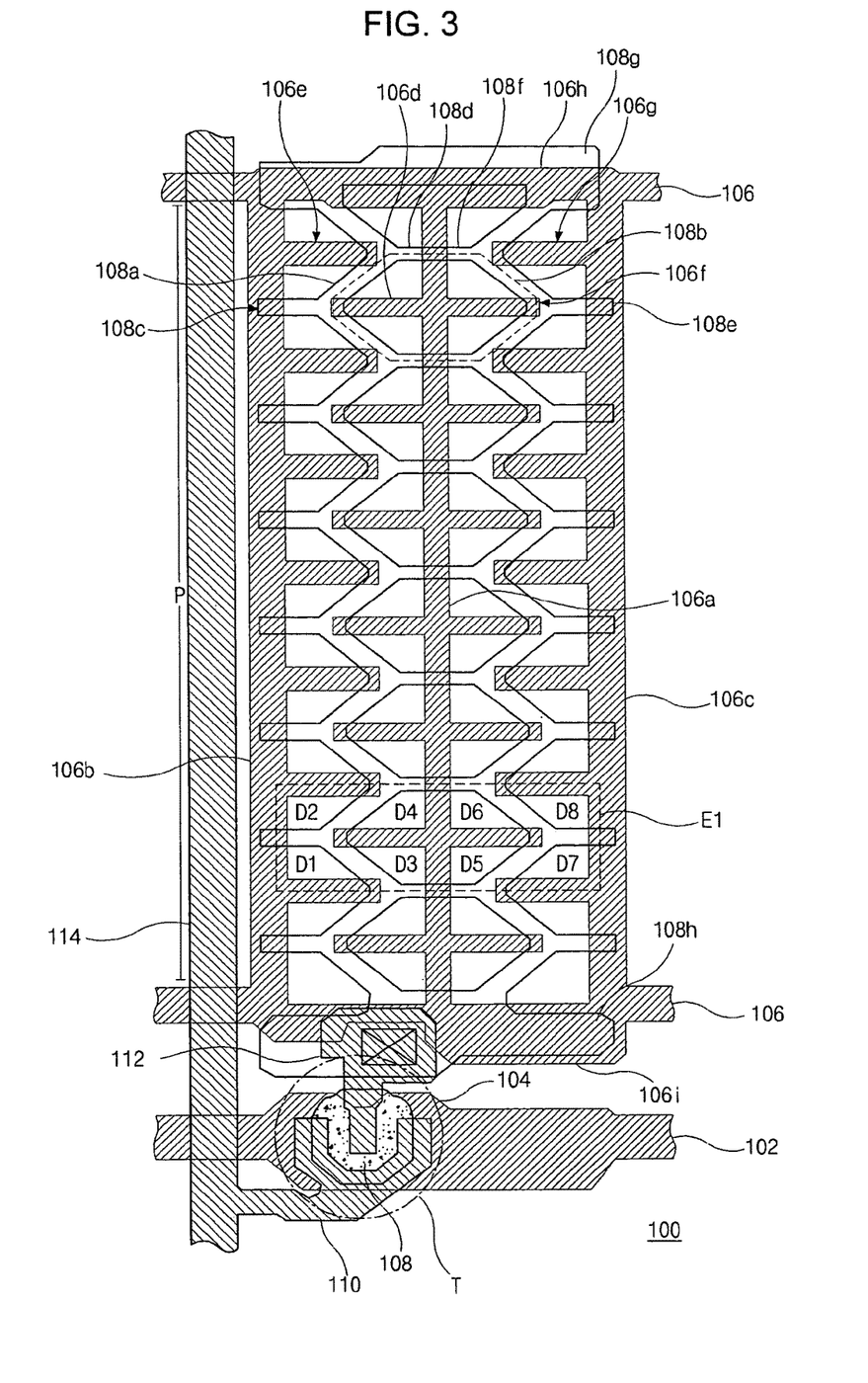
FIG. 3 is a plan view illustrating an array substrate for an IPS-LCD device according to a first embodiment of the present invention.
Figure 4A:
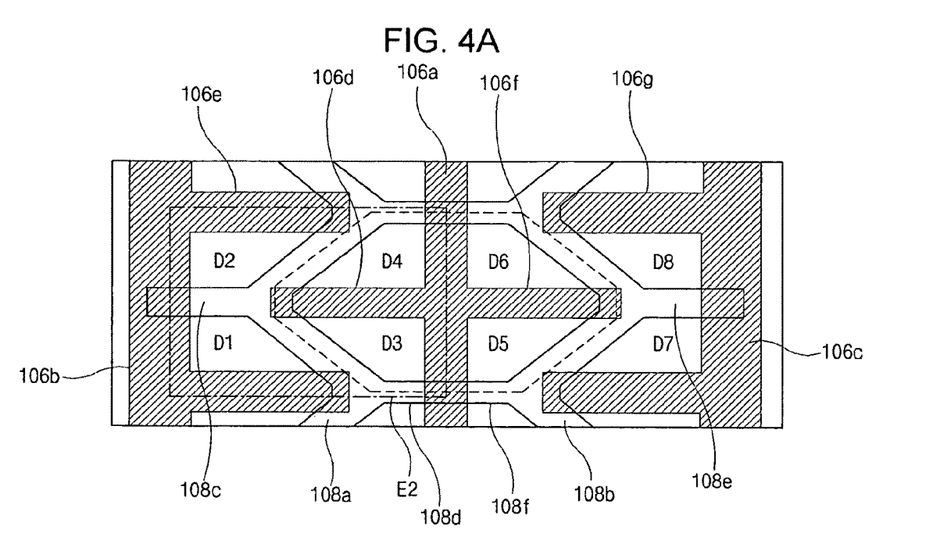
FIG. 4A is a view enlarging a region E1 of FIG. 3.
Figure 4B:
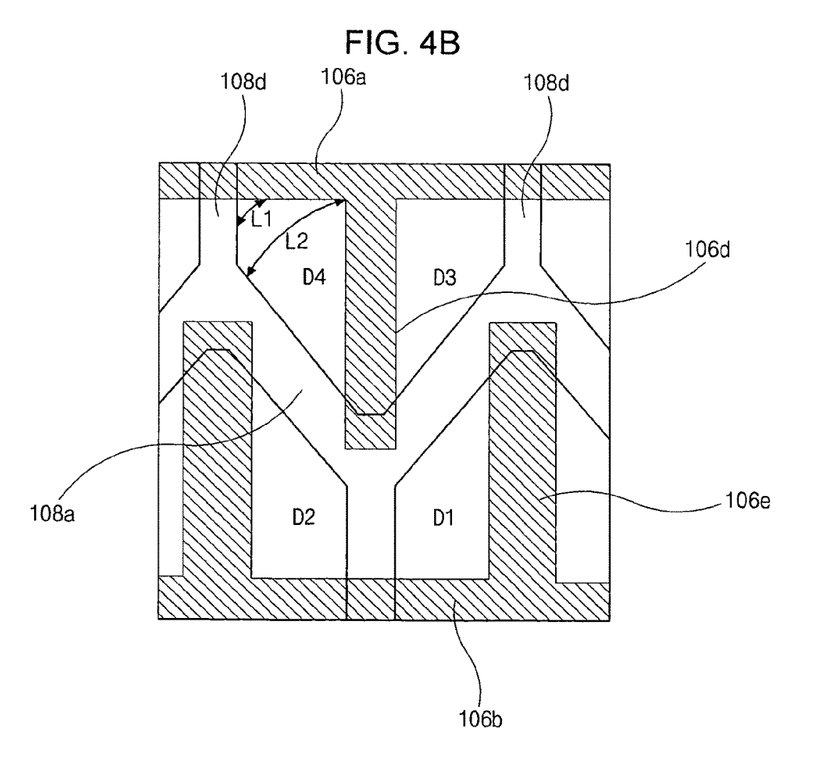
FIG. 4B is a view enlarging a region E2 of FIG. 4A rotated at an angle of 90 degrees.

FIG. 3 is a plan view illustrating an array substrate for an IPS-LCD device according to a first embodiment of the present invention, FIG. 4A is a view enlarging a region E1 of FIG. 3, and FIG. 4B is a view enlarging a region E2 of FIG. 4A rotated at an angle of 90 degrees.

Referring to FIGS. 3 to 4B, a gate line 102 and a data line 114 cross each other to define a pixel region P on a substrate 100. A thin film transistor T is near a crossing portion of the gate line 102 and the data line 114.

The thin film transistor T includes a gate electrode 104, a semiconductor layer 108 on the gate electrode 104, and source and drain electrodes 110 and 112, respectively, on the semiconductor layer 108. The gate electrode 104 is connected to the gate line 102, and the source electrode 110 is connected to the data line 114, and the drain electrode 112 is spaced apart from the source electrode 110.

A pixel electrode and a common electrode are in the pixel region P to form multiple domains. For example, the pixel electrode may include first and second pixel portions 108a and 108b, first to fourth pixel protrusion portions 108c to 108f and first and second pixel connection portions 108g and 108h. The common electrode may include first to third common portions 106a to 106c, first to fourth common protrusion portions 106d to 106g, and first and second common connection portions 106h and 106i. There may be at least an insulating layer between the pixel electrode and the common electrode.

The pixel electrode and the common electrode may have a symmetrical structure with respect to the first common portion 106a. In other words, with respect to the first common portion 106a, the first pixel portion 108a and the first and second pixel protrusion portions 108c and 108d are symmetrical to the second pixel portion 108b and the third and fourth pixel protrusion portions 108e and 108f, respectively. The second common portion 106b and the first and second common protrusion portions 106d and 106e are symmetrical to the third common portion 106c and the third and fourth common protrusion portions 106f and 106g.

In more detail, the first pixel portion 108a may have a shape which is bent alternately in an opposing direction, and the first and second pixel protrusion portions 108c and 108d protrude from the first pixel portion 108a alternately in an opposing direction. The first pixel portion 108a is between the first and second common portions 106a and 106b. The first and second common protrusion portions 106d and 106e protrude from the first and second common portions 106a and 106b, respectively, alternately in an opposing direction. The first common protrusion portion 106d is in the same direction as the first pixel protrusion portion 108c, and is between the adjacent second pixel protrusion portions 108d. The second common protrusion portion 106e is in the same direction as the second pixel protrusion portion 108d, and is between the adjacent first pixel protrusion portions 108c. The first common protrusion portion 106d overlaps a bent portion of the first pixel portion 108a where the first pixel protrusion portion 108c protrudes. The second common protrusion portion 106e overlaps a bent portion of the first pixel portion 108a where the second pixel protrusion portion 108d protrudes. The first pixel protrusion portion 108c overlaps the second common portion 106b. The second pixel protrusion portion 108d overlaps the first common portion 106a. In a symmetrical manner with respect to the first common portion 106a, the second pixel portion 108b, the third and fourth pixel protrusion portions 108e and 108f, the third common portion 106c, and the third and fourth common protrusion portions 106f and 106g are arranged. The second and fourth pixel protrusion portions 108d and 108f may be connected to each other.

The first to third common portions 106a to 106c may be connected at both ends thereof through the first and second common connection portions 106h and 106i. The first and second pixel portions 108a and 108b may be connected at both ends thereof through the first and second pixel connection portions 108g and 108h.

The common electrodes in adjacent pixel regions P are connected through a common line 106. The common electrode may be outside of the pixel electrode to prevent a signal of the data line from interfering in a signal of the pixel electrode.

Through the above described structure of the pixel and common electrodes, first to eighth domains D1 to D8 are formed in the pixel region P. The first to eighth domains D1 to D8 may be arranged repeatedly. The domains D1 to D8 are symmetrical with respect to the first common portion 106a. Further, the domains D1 to D8 are symmetrical with respect to an extension direction of the first and third pixel protrusions 108c and 108e and the first and third common protrusions 106d and 106f, or an extension direction of the second and fourth pixel protrusions 108d and 108f and the second and fourth common protrusions 106e and 106g.

In the above description, the pixel electrode has a bent shape, and the pixel electrode and the common electrode have a symmetrical structure with respect to the common portion of the common electrode. Alternatively, a common electrode may have a bent shape, and a pixel electrode and the common electrode may have a symmetrical structure with respect to a pixel portion of the pixel electrode.

As such, the domains are symmetrical, and a symmetrical structure is formed with respect to the pixel electrode and/or common electrode. By the symmetrical structure, a wide viewing angle can be obtained.

Referring to FIG. 4B, in each domain, distances between the pixel electrode and the common electrode are different. This structure may contribute to a fast response time of the liquid crystal molecules in each domain. This phenomenon is explained, for example, with reference to a fourth domain D4. Liquid crystal molecules along a first distance L1 as a short distance respond faster than those along a second distance L2 as a long distance. The fast response time of the liquid crystal molecules along the first distance L1 has an influence on adjacent liquid crystal molecules, and this influence spreads. Accordingly, a response time of the liquid crystal molecules in the domain D4 becomes fast.

Figure 5A:
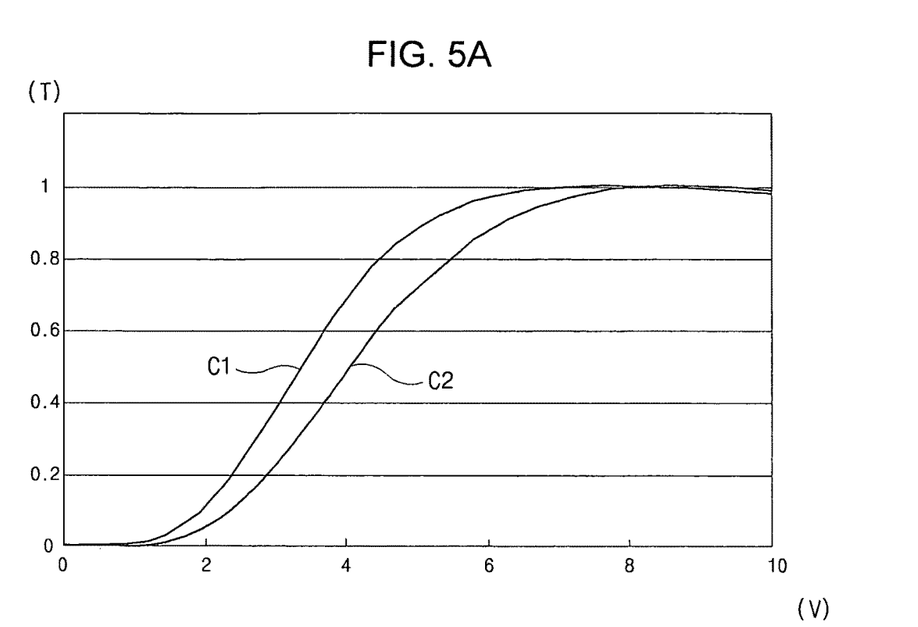
FIG. 5A is a graph illustrating light transmittance-voltage (T-V) curves of domains at short and long distances, respectively, between a pixel electrode and a common electrode.
Figure 5B:
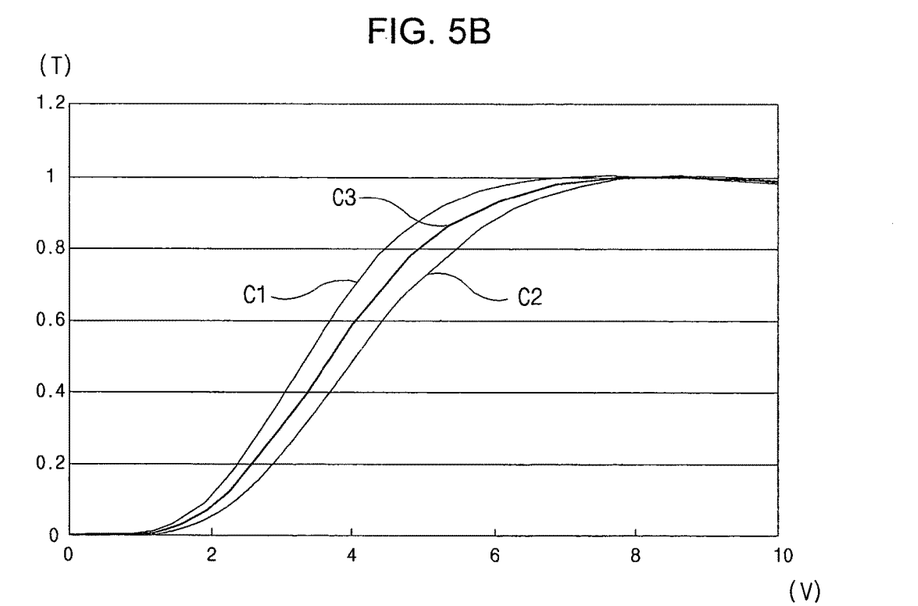
FIG. 5B is a graph illustrating a T-V curve of a domain having both short and long distances according to the first embodiment of the present invention.

FIG. 5A is a graph illustrating light transmittance-voltage (T-V) curves of domains at short and long distances, respectively, between a pixel electrode and a common electrode, and FIG. 5B is a graph illustrating a T-V curve of a domain having both short and long distances according to the first embodiment of the present invention.

Referring to FIG. 5A, a T-V curve C2 of a domain having a long distance, for example, a second distance L2 of FIG. 4B is located at right, compared to a T-V C1 curve a domain having a short distance, for example, a first distance L1 of FIG. 4B. At the same voltage, a light transmittance for the short distance is higher than a light transmittance for the long distance. In other words, a response time for the short distance is faster than a response time for the long distance.

Referring to FIG. 5B, a T-V curve C3 of a domain having both the short and long distances, for example, a fourth domain D4 is located between the T-V curves C1 and C2 of the domains having the short and long distances as shown in FIG. 5A. In other words, a response time of the domain having both the short and long distances is faster than a response time of the domain having the long distance.

Figure 6:
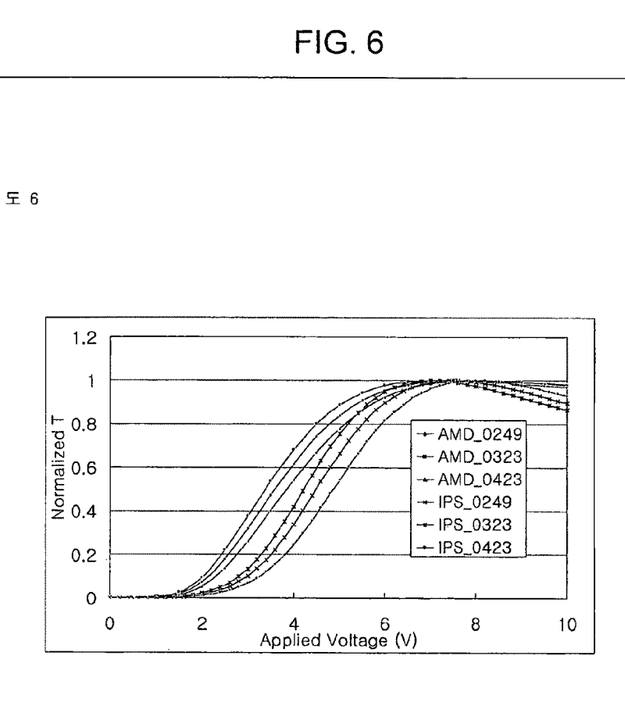
FIG. 6 is a graph comparing T-V curves of the related art S-IPS-LCD devices with T-V curves of IPS-LCD devices according to the first embodiment of the present invention.

FIG. 6 is a graph comparing T-V curves of the related art S-IPS-LCD devices with T-V curves of IPS-LCD devices according to the first embodiment of the present invention. In FIG. 6, references "AMD" and "IPS" represent IPS-LCD devices according to the first embodiment and the relater art, respectively. References "0249," "0323," and "0423" represent types of liquid crystal material.

Referring to FIG. 6, T-V curves of the IPS-LCD devices of the first embodiment are located at left, compared to T-V curves of the related art IPS-LCD devices. In other words, response times of the IPS-LCD devices of the first embodiment are faster than response times of the related art IPS-LCD devices.

Further, at a voltage equal to or more than 6 volts, for example, at about 7 volts, the related art IPS-LCD devices have a highest light transmittance, and over this voltage, the related art IPS-LCD devices have their light transmittance decreased. However, the IPS-LCD devices of the first embodiment have a highest light transmittance in a range of about 6 to 10 volts. Accordingly, the IPS-LCD device may not need an expensive driving circuit for fast-operation, and thus product cost can be reduced.

Further, in the IPS-LCD device according to the first embodiment, liquid crystal molecules of all regions between the pixel electrode and the common electrode can be arranged normally and the regions can be used as an aperture region. Accordingly, disclination can be prevented and display quality can be improved.

Figure 7:
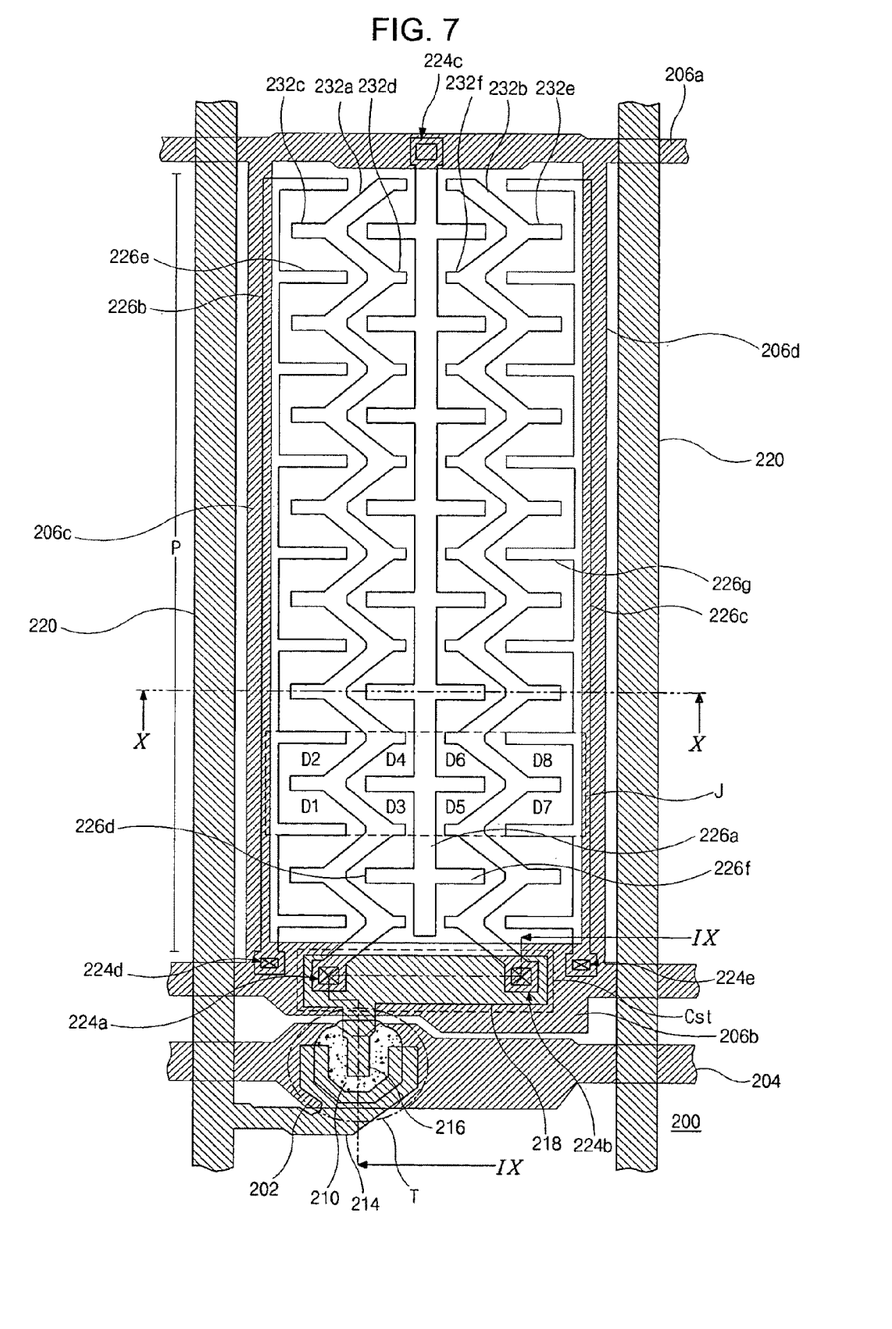
FIG. 7 is a plan view illustrating an array substrate for an IPS-LCD device according to a second embodiment of the present invention.

FIG. 7 is a plan view illustrating an array substrate for an IPS-LCD device according to a second embodiment of the present invention. Explanations of parts similar to those parts of the first embodiment may be omitted.

Referring to FIG. 7, a gate line 204 and a data line 220 cross each other to define a pixel region P on a substrate 200. A thin film transistor T is near a crossing portion of the gate line 204 and the data line 220.

The thin film transistor T includes a gate electrode 202, a semiconductor layer 210 over the gate electrode 202, and source and drain electrodes 214 and 216, respectively, on the semiconductor layer 210. The gate electrode 202 is connected to the gate line 204, and the source electrode 214 is connected to the data line 220, and the drain electrode 216 is spaced apart from the source electrode 214.

A pixel electrode and a common electrode are in the pixel region P to form multiple domains. For example, the pixel electrode may include first and second pixel portions 232a and 232b, and first to fourth pixel protrusion portions 232c to 232f. The common electrode may include first to third common portions 226a to 226c, and first to fourth protrusion portions 226d to 226g.

The pixel electrode and the common electrode may have a symmetrical structure with respect to the first common portion 226a. In other words, with respect to the first common portion 226a, the first pixel portion 232a and the first and second pixel protrusion portions 232c and 232d are symmetrical to the second pixel portion 232b and the third and fourth pixel protrusion portions 232e and 232f, respectively. The second common portion 226b and the first and second common protrusion portions 226d and 226e are symmetrical to the third common portion 226c and the third and fourth common protrusion portions 226f and 226g.

In more detail, the first pixel portion 232a may have a shape which is bent alternately in an opposing direction, and the first and second pixel protrusion portions 232c and 232d protrude from the first pixel portion 232a alternately in an opposing direction. The first pixel portion 232a is between the first and second common portions 226a and 226b. The first and second common protrusion portions 226d and 226e protrude from the first and second common portions 226a and 226b, respectively, alternately in an opposing direction. The first common protrusion portion 226d is in the same direction as the first pixel protrusion portion 232c, and is between the adjacent second pixel protrusion portions 232d. The second common protrusion portion 226e is in the same direction as the second pixel protrusion portion 232d, and is between the adjacent first pixel protrusion portions 232c.

The pixel electrode and the common electrode may be formed of the same material and in the same layer. Accordingly, the pixel electrode and the common electrode do not overlap each other. In more detail, the first common protrusion portion 226d is spaced apart from a bent portion of the first pixel portion 232a where the first pixel protrusion portion 232c protrudes. The second common protrusion portion 226e is spaced apart from a bent portion of the first pixel portion 232a where the second pixel protrusion portion 232d protrudes. The first pixel protrusion portion 232c is spaced apart from the second common portion 226b. The second pixel protrusion portion 232d is spaced apart from the first common portion 226a. The spaced distance as described above may be about 5 µm to about 10 µm. This distance can prevent light leakage of the spaced region. Accordingly, the IPS-LCD of the second embodiment can have multiple domains operating similarly to those of the first embodiment, without overlapping the pixel electrode and the common electrode.

In a symmetrical manner with respect to the first common portion 226a, the second pixel portion 232b, the third and fourth pixel protrusions 232e and 232f, the third common portion 226c, and the third and fourth common protrusions 226f and 226g are arranged.

The first to third common portions 226a to 226c may be connected to a common line at at least one end thereof. A common line may include first and second lines 206a and 206b at top and bottom. A second line 206b overlaps an extension portion 218 extending from the drain electrode 216. The second line 206b and the extension portion 218 form a storage capacitor, Cst. First and second connection portions 206c and 206d are at both sides of the pixel region P and connect the first and second lines 206a and 206b. The first and second connection portions 206c and 206d may be outside of the pixel electrode to prevent a signal of the data line from interfering with a signal of the pixel electrode.

Through the above described structure of the pixel and common electrodes, first to eighth domains D1 to D8 are formed in the pixel region P. The first to eighth domains D1 to D8 may be arranged repeatedly. The domains D1 to D8 are symmetrical with respect to the first common portion 106. Further, the domains D1 to D8 are symmetrical with respect to an extension direction of the first and third pixel protrusions 232c and 232e and the first and third common protrusions 226d and 226f, or an extension direction of the second and fourth pixel protrusions 232d and 232f and the second and fourth common protrusions 226e and 226g. As such, the domains are symmetrical, and a symmetrical structure is formed with respect to the pixel electrode and/or common electrode. By the symmetrical structure, a wide viewing angle can be obtained.

The first and second pixel portions 232a and 232b contact the extension portion 218 through the first and second contact holes 224a and 224b, respectively. The first common portion 226a may contact the first line 206a through the third contact hole 224c, and the second and third common portions 226b and 226c may contact the second line 206b through the fourth and fifth contact holes 224d and 224e, respectively.

Figure 8A:
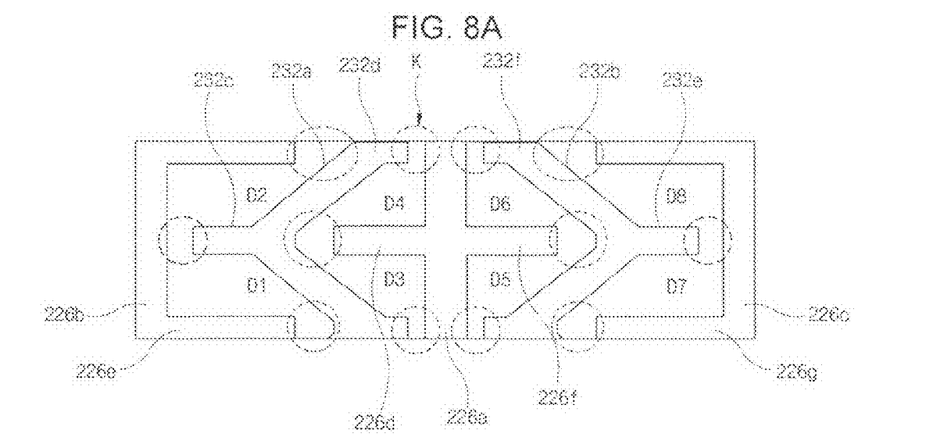
FIG. 8A is a view enlarging a region J of FIG. 7.
Figure 8B:
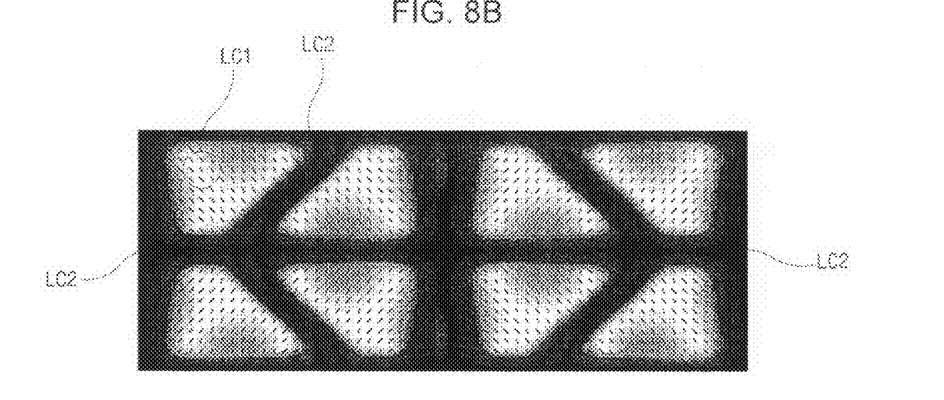
FIG. 8B is a view illustrating arrangement of liquid crystal molecules, light transmittance and light blocking in the region J of FIG. 8A.

FIG. 8A is a view enlarging a region J of FIG. 7, and FIG. 8B is a view illustrating an arrangement of liquid crystal molecules, light transmittance and light blocking in the region J of FIG. 8A.

Referring to FIGS. 8A and 8B, pixel protrusion portions 232c to 232f are spaced apart from common portions 226a to 226c, common protrusion portions 226d to 226g are spaced apart from pixel portions 232a and 232b, and there are spaced regions K between the above portions spaced apart.

An alignment layer (not shown) in the array substrate may have a rubbing direction horizontally, and liquid crystal molecules in the pixel region are initially arranged in the rubbing direction. When voltages are applied to the pixel electrode and the common electrode and in-plane electric fields are induced in domains D1 to D8, the liquid crystal molecules LC1 in the domains D1 to D8 are arranged according to the in-plane electric fields. However, because electric fields in the spaced regions K are induced in a horizontal direction, the liquid crystal molecules LC2 in the spaced regions K maintain an initial arrangement. Liquid crystal molecules over the pixel electrode and the common electrode also have an initial arrangement. Because the liquid crystal molecules LC2 in the spaced regions K maintain an initial arrangement, light does not pass through the spaced regions K. Accordingly, light leakage through the spaced region can be prevented.

In the second embodiment, the pixel electrode and the common electrode are formed in the same process, and the domains operating similar to those of the first embodiment are formed. Accordingly, process and product cost can be reduced. Further, because the common electrode is formed with a transparent material, brightness can increase.

FIGS. 9A to 9D and 10A to 10D are cross-sectional views, taken along lines IX-IX and X-X of FIG. 7, illustrating a method of manufacturing an array substrate according to the second embodiment of the present invention.

Figure 9A:
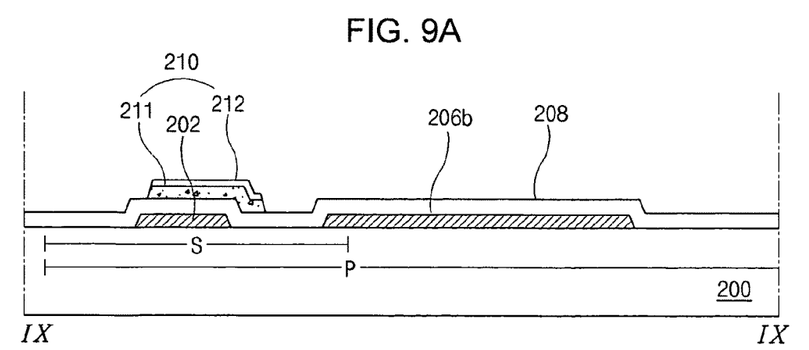
FIGS. 9A to 9D and 10A to 10D are cross-sectional views, taken along lines IX-IX and X-X of FIG. 7, illustrating a method of manufacturing an array substrate according to the second embodiment of the present invention.
Figure 10A:
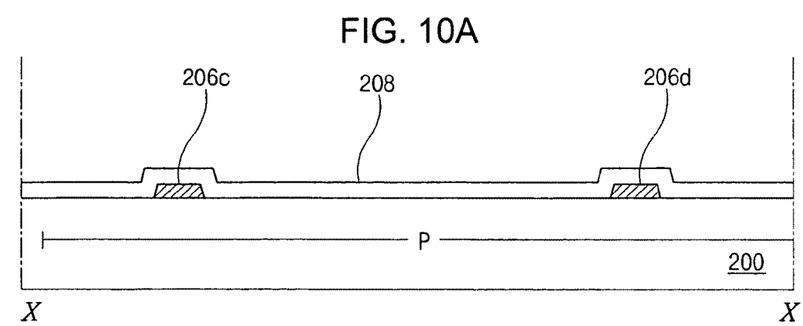

Referring to FIGS. 9A and 10A, at least one metallic material is deposited on a substrate 200 having a pixel region P and a switching region S and patterned with a mask process to form a gate electrode 202, a gate line (204 of FIG. 7), a first line (206a of FIG. 7), a second line 206b and first and second connection portions 206c and 206d. The metallic material may include aluminum (Al), aluminum alloy, chromium (Cr), molybdenum (Mo), copper (Cu), molybdenum alloy, tungsten (W) and titanium (Ti) or any other suitable material. A gate insulating layer 208 is formed on the substrate 200 having the gate electrode 202.

The gate insulating layer 208 includes an inorganic material such as silicon nitride (SiNx) and silicon oxide ($SiO_2$), and an organic material such as benzocyclobutene (BCB) and acrylic. A semiconductor layer 210 is formed on the gate insulating layer 208 corresponding to the gate electrode 202. The semiconductor layer 210 includes an active layer 211 of intrinsic amorphous silicon and an ohmic contact layer 212 of impurity-doped amorphous silicon.

Figure 9B:
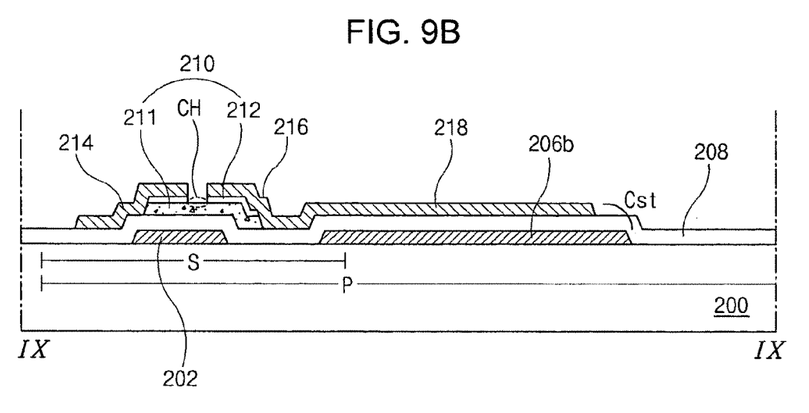
Figure 10B:
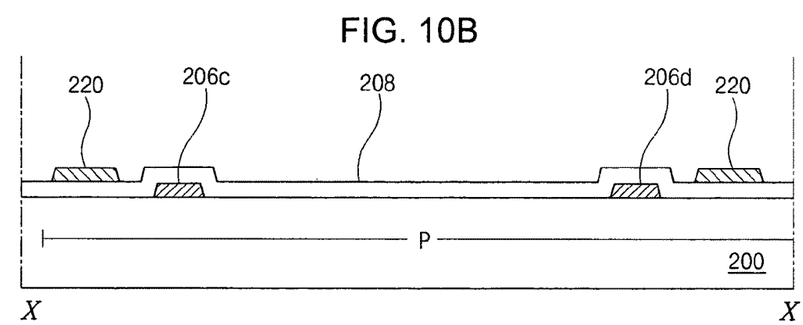

Referring to FIGS. 9B and 10B, at least one metallic material is deposited on a substrate 200 having the semiconductor layer 210 and patterned with a mask process to form a data line 220, source and drain electrodes 214 and 216 and an extension portion 218. The ohmic contact layer between the source and drain electrodes 214 and 216 are removed. A portion of the active layer 211 exposed is referred to as a channel portion CH. The extension portion 218 and the second line 206b form a storage capacitor with the gate insulating layer 208 therebetween.

Figure 9C:
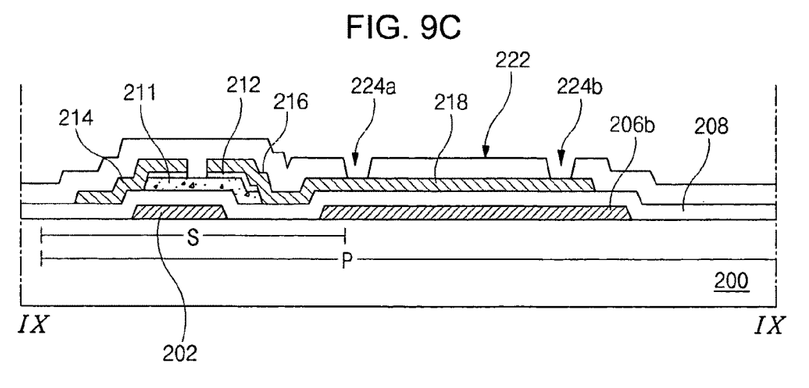
Figure 10C:
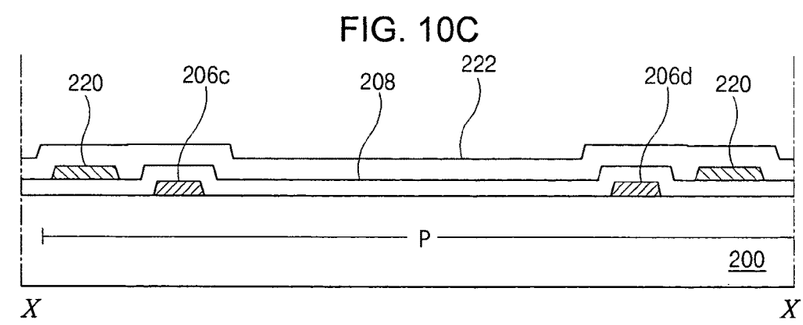

Referring to FIGS. 9C and 10C, a passivation layer 222 is formed on the substrate 200 having the data line 220. The passivation layer 222 includes an inorganic material such as silicon nitride (SiNx) and silicon oxide (SiO₂), and an organic material such as benzocyclobutene (BCB) and acrylic. The passivation layer 222 is patterned with a mask process to form first and second contact holes 224a and 224b exposing the extension portion 218. Further, the passivation layer 222 and the gate insulating layer 208 are patterned with the mask process to form third to fifth contact holes (224c to 224e of FIG. 7). The third and fourth contact holes may expose the first and second connection portions 206c and 206d, and the fifth contact hole may expose the first line.

Figure 9D:
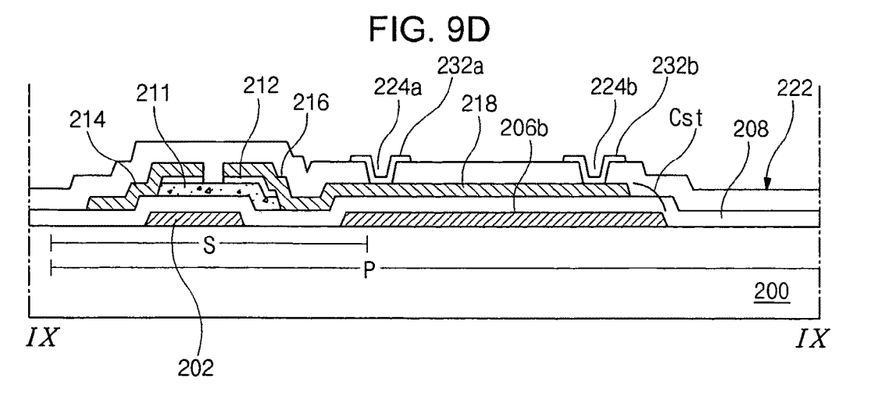
Figure 10D:
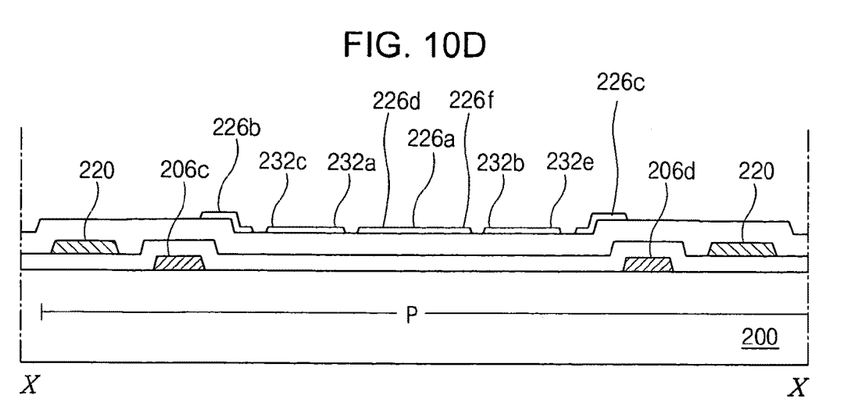

Referring to FIGS. 9D and 10D, a transparent conductive material is deposited on the passivation layer 222 and patterned with a mask process to form a pixel electrode and a common electrode. The transparent conductive material includes indium-tin-oxide (ITO), indium-zinc-oxide (IZO) and indium-tin-zinc-oxide (ITZO).

The pixel electrode includes first and second pixel portions 232a and 232b and first to fourth pixel protrusion portions 232c, (232d of FIG. 7,) 232e (and 232f of FIG. 7). The common electrode includes first to third common portions 226a to 226c and first to fourth common protrusion portions 226d, (226e of FIG. 7,) 226f (and 226g of FIG. 7). The first and second pixel portions 232a and 232b contact the extension portion 218 through the first and second contact holes 224a and 224b, respectively. The first common portion 226a may contact the first line through the third contact hole, and the second and third common portions contact the second line 206b through the fourth and fifth contact holes, respectively.

After forming the pixel electrode, an alignment layer may be formed on the pixel electrode. Through the above processes, the array substrate can be fabricated. The array substrate and an opposing substrate, for example, a color filter substrate are attached between a liquid crystal layer therebetween to fabricate the IPS-LCD device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a gate line and a data line crossing each other to define a pixel region on a substrate;
    a thin film transistor connected to the gate and data lines and including a gate electrode extending from the gate line, a semiconductor layer over the gate electrode, source and drain electrode on the semiconductor layer and spaced apart from each other, the source electrode extending from the data line;
    a pixel electrode in the pixel region and including a first pixel portion which has a plurality of bent portions and first and second pixel protrusion portions protruding from the bent portions alternately in an opposing direction; and
    a common electrode in the pixel region and including first to third common portions, a plurality of first common protrusion portions extending from the first common portion toward the second common portion, a plurality of second common protrusion portions extending from the second common portion toward the first common portion, a plurality of third common protrusion portions extending from the first common portion toward the third common portion, and a plurality of fourth common protrusion portions extending from the third common portion toward the first common portion,
    wherein the first and second pixel protrusion portions are substantially parallel to the gate line, and the first common portion is positioned between the second and third common portions,
    wherein the first common protrusion portions are alternately arranged with the second common protrusion portions, and the third common protrusion portions are alternately arranged with the fourth common protrusion portions, and wherein at least one of the second and fourth common protrusion portions is spaced apart from the first common portion.

2. The device according to claim 1, wherein the pixel electrode further includes a second pixel portion and third and fourth protrusion portions symmetrical with the first pixel portion and the first and second pixel protrusion portions, respectively, with respect to the first common portion.

3. The device according to claim 2, further comprising at least one insulating layer between the common electrode and the pixel electrode.

4. The device according to claim 3, wherein the first and second pixel protrusion portions overlap the second and first common portions, respectively.

5. The device according to claim 4, wherein the second and fourth pixel protrusion portions are connected to each other.

6. The device according to claim 4, wherein the first and second common protrusion portions overlap the bent portions of the first pixel portion.

7. The device according to claim 2, wherein the common electrode is located at the same layer as the pixel electrode.

8. The device according to claim 7, wherein the first and second pixel protrusion portions are spaced apart from the second and first common portions, respectively, and the first and second common protrusion portions are spaced apart from the bent portions of the first pixel portion.

9. The device according to claim 8, wherein the spaced distance is about 5 μm to about 10 μm.

10. A method of fabricating a liquid crystal display device, comprising:
    forming a gate line and a data line crossing each other to define a pixel region on a substrate;
    forming a thin film transistor connected to the gate and data lines and including a gate electrode extending from the gate line, a semiconductor layer over the gate electrode, source and drain electrode on the semiconductor layer and spaced apart from each other, the source electrode extending from the data line;
    forming a pixel electrode in the pixel region and including a first pixel portion which has a plurality of bent portions and first and second pixel protrusion portions protruding from the bent portions alternately in an opposing direction; and
    forming a common electrode in the pixel region and including first to third common portions, a plurality of first common protrusion portions extending from the first common portion toward the second common portion, a plurality of second common protrusion portions extending from the second common portion toward the first common portion, a plurality of third common protrusion portions extending from the first common portion toward the third common portion, and a plurality of fourth common protrusion portions extending from the third common portion toward the first common portion,
    wherein the first and second pixel protrusion portions are substantially parallel to the gate line, and the first common portion is positioned between the second and third common portions, wherein the first common protrusion portions are alternately arranged with the second common protrusion portions, and the third common protrusion portions are alternately arranged with the fourth common protrusion portions, and wherein at least one of the second and fourth common protrusion portions is spaced apart from the first common portion.

11. The method according to claim 10, wherein forming the pixel electrode further includes forming a second pixel portion and third and fourth protrusion portions symmetrical with the first pixel portion and the first and second pixel protrusion portions, respectively, with respect to the first common portion.

12. The method according to claim 11, further comprising forming at least one insulating layer between the common electrode and the pixel electrode.

13. The method according to claim 12, wherein the first and second pixel protrusion portions overlap the second and first common portions, respectively.

14. The method according to claim 13, wherein the second and fourth pixel protrusion portions are connected to each other.

15. The method according to claim 14, wherein the first and second common protrusion portions overlap the bent portions of the first pixel portion.

16. The method according to claim 11, wherein the common electrode is formed during the same process of forming the pixel electrode.

17. The method according to claim 16, wherein the first and second pixel protrusion portions are spaced apart from the second and first common portions, respectively, and the first and second common protrusion portions are spaced apart from the bent portions of the first pixel portion.

18. The method according to claim 17, wherein the spaced distance is about 5 µm to about 10 µm.

* * * * *